Feb. 28, 1939.  R. O. PETERSON ET AL  2,149,147
FLUID SEAL DIAPHRAGM
Filed Aug. 26, 1935
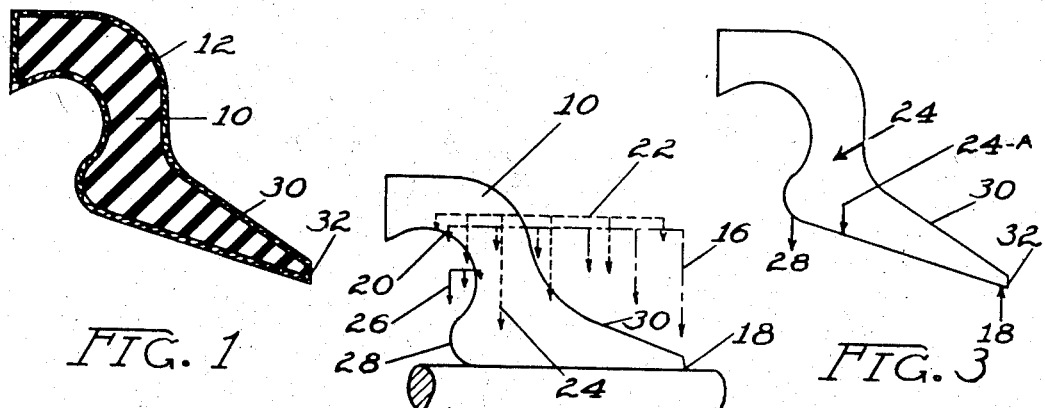
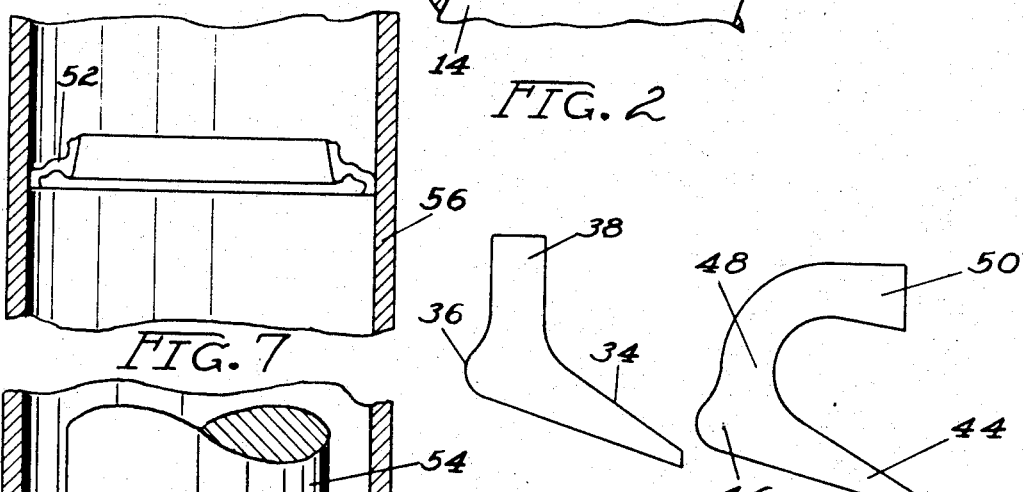
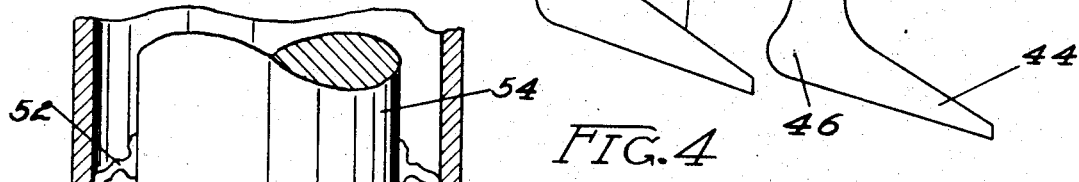
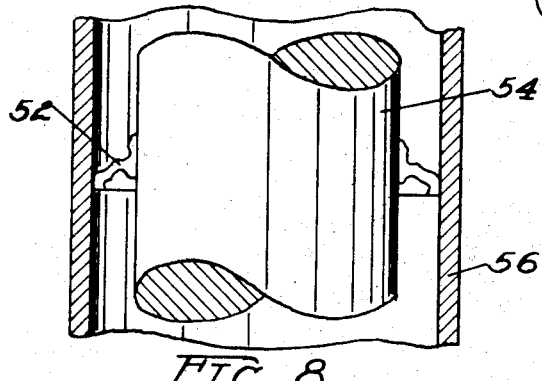
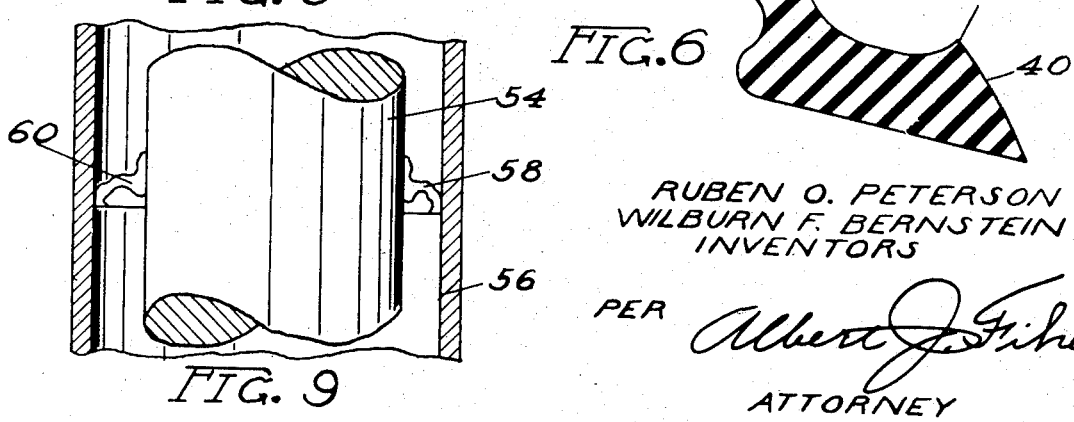
RUBEN O. PETERSON
WILBURN F. BERNSTEIN
INVENTORS
PER  Albert J. Fihe
ATTORNEY Patented Feb. 28, 1939

2,149,147

UNITED STATES PATENT OFFICE 2,149,147

FLUID SEAL DIAPHRAGM

Ruben O. Peterson, Glen Ellyn, and Wilburn F. Bernstein, Brookfield, Ill., assignors to Victor Manufacturing & Gasket Company, Chicago, Ill., a corporation of Illinois Application August 26, 1935, Serial No. 37,902

1 Claim. (Cl. 288—1)

This invention relates to an improved liquid and fluid retainer diaphragm and has for one of its principal objects the provision of a sealing means comprising essentially a flexible member held in position between a rotating and a fixed body.

One of the important objects of this invention is to provide an oil retainer diaphragm which is of such a construction that the usual garter or other spring, which is ordinarily employed to hold the wiping surface against the moving shaft, can be eliminated.

Another object of the invention is the provision of an oil retainer diaphragm which can be used either with or without a spring and which is so constructed that the portion which contacts the rotating shaft will always grip the shaft regardless of slight eccentricities in movement and without destroying or lessening the effectiveness of the seal. This includes a construction which embodies a natural, structural or mechanical resilience in the diaphragm itself.

Another and further advantage of the design is the inclusion of a properly shaped flange, body structure, and edge for sealing purposes whereby the body structure is such that it will flex to considerable extent, thereby affording an absolute liquid-sealing contact with the shaft at all times and under almost all conditions of service and wear.

A further object of the invention is to provide a diaphragm or packing element of such construction that when positioned on a shaft, whether reciprocating or rotary, certain internal forces are set up in the diaphragm itself which will tend to produce an effective and constant seal.

Another and still further object is the production of a fluid seal diaphragm having an improved sealing edge.

An additional object is the provision of an improved composition of material whereby a more flexible and longer wearing diaphragm results.

Other and further important objects of the invention will be apparent from the disclosures in the accompanying drawing and following specification.

The invention, in a preferred form, is shown in the drawing and hereinafter more fully described.

In the drawing:

Figure 1 is a sectional view of the improved springless oil retainer diaphragm of this invention, showing a preferred embodiment of the invention.

Figure 2 is a sectional view similar to Figure 1, illustrating the forces which come into play when the diaphragm of this invention is placed in position on a shaft.

Figure 3 illustrates the action of another set of forces distinct from those illustrated in Figure 2.

Figure 4 shows a modified form of the invention.

Figure 5 illustrates a further modification.

Figure 6 shows still another modification.

Figures 7, 8 and 9 respectively show one of the improved diaphragms of this invention in position in a housing without a shaft, on a concentric shaft, and on an off-center shaft.

As shown in the drawing:

The reference numeral 10 indicates generally the structure of one of the improved diaphragms of this invention, the same including a core or central portion which is made of a resilient plastic such as synthetic rubber, a cellulose plastic, gelatin plastic or the like. The outer portion 12 of the diaphragm is composed of a treated fabric such as cotton duck, silk, paper or some other similar materials or combinations thereof, the same being treated with some impregnating material such as albumen, gelatin, a cellulose plastic or the like with which is incorporated graphite, or other suitable friction reducing material, which acts as a surface lubricant.

One of the plastics used is more specifically synthetic rubber so compounded as to be relatively unaffected by oil or other fluids hereinbefore mentioned. Another composition is a cellulose plastic which is produced by treating high viscosity cellulose acetate with certain solvents such as alcohol and benzine in combination with each other and which dissolve the acetate when boiled in an excess thereof. When this solution is cooled, the cellulose acetate precipitates out in a swelled condition, and this precipitate can then be dissolved in a suitable solvent such as tetrachlorethane in which it is readily soluble. To this solution is then added a resin of a type which will plasticize these cellulose products. A particular resin which has been found to be useful is rezyl balsam. The quantities of ingredients used will change the plasticity as desired, and certain fillers may be added if considered necessary or required.

The resulting material can be poured out in trays, and upon evaporation of the solvent, sheets are formed which can be molded, and they have a resilient nature after molding.

A further plastic material which has also been found valuable and efficient is gelatin plastic which is sheeted and then rendered insoluble by tanning or curing with such agents as formaldehyde, tannic acid or the like.

The fabrics such as cotton duck, silk, paper or the like are preliminarily treated by spraying or immersing in one of several solutions, as, for example, a solution of albumen containing about four per cent of graphite and which is later set by the addition of formaldehyde. Another good impregnating material for the fabric is a cellulose plastic solution with about four per cent of graphite added.

These treated fabrics are dried, blanked and then assembled with the plastic material above described, after which they are molded into various diaphragms of the desired shape as shown in the drawing, or laminated into flat discs or sheets. Heat and pressure is ordinarily used in the molding process.

As best shown in Figure 2, the diaphragm 10 when applied to a shaft 14 has several distinct sets of forces acting therein. One set of forces is illustrated by the dot and dash lines 16. These forces are exerted all along the wiping surface of the diaphragm due to the resistance of its material to stretch. These forces are greatest at the points where the arrows are shown as longest, and particularly at the outer edge 18 of the diaphragm, and diminish as shown by the arrows up to the point 20 where they are negligible.

Another set of forces acts as illustrated by the dash lines 22. These are forces due to the resistance of the diaphragm to flexion or bending, resulting from the inserting of the shaft. These forces are also transmitted to all points of wiping surface, and this is greatest at the point 24 indicated by the longest arrow. This force diminishes toward the toe of the diaphragm and also toward the heel as shown.

The forces shown by the lines 16 and 22 are the two major forces involved, but there is, however, a third set of forces or stresses which are essential and which are indicated by the full lines 26. These forces are exerted strongest at the heel of the diaphragm 28 and at the point shown by the longest arrow, and diminish toward the point 24. This is caused by a simple lever action about some point as indicated by the arrow 24 as a fulcrum. As the shaft is inserted, it presses the point 18 upward which causes a downward force greatest at the point 28 to be exerted, which, of course, diminishes toward the point 24 where it is entirely negligible.

We have no intention to limit ourselves to the detailed location or distribution of the forces as outlined above. But the advantage we claim is that we have a construction wherein we can distribute, locate, emphasize and diminish pressures and other forces, by slight changes in dimensions, to the advantage of improving the operation of the diaphragm.

The long tapering surface 30 on the oil contact face of the diaphragm takes advantage of the oil pressure exerted when the diaphragm is in operation, and this can be either a long line as shown with a short face 32 or may be in the form of a hyperbolic curve 40 as illustrated in Figure 6. With this type, a constricting spring may be used, an annular ledge or supporting face for the spring being incorporated as shown at 42.

As best shown in Figure 4, a type which has a toe portion 34 and a heel portion 36 together with a simple stem portion 38 may be used. As shown in Figure 5, a type of diaphragm having a toe portion 44, a heel portion 46, a stem 48 and a holding or supporting portion 50 which is reversed from the corresponding portion of the diaphragm shown in Figures 1, 2 and 3, may be used.

Any of the cross sections shown can be considered as having their wiping surfaces contacting fixed or rotating surfaces internal or external to themselves.

It will be evident that herein is provided a diaphragm for fluid seals or grease retainers which, through its various modifications, is adaptable to any and all requirements, either internally of a shell for contact with a shaft, or externally of a shell for contact with a housing surrounding a shaft.

In Figure 7 is shown a diaphragm 52 similar to that shown in Figure 6 in position in a housing and without a shaft. This diaphragm includes the features shown in Figures 1 to 3 inclusive and will have the internal stresses and forces set up therein when a shaft 54 is forced therethrough as shown in Figure 8.

A long body portion or what might be termed the stem of this particular diaphragm is such that it will readily flex, and if the shaft 54 is out of alignment in the housing 56 due to faulty construction, wear or some other cause, the diaphragm will flex with this misalignment, buckling as shown at 58 in Figure 9 and stretching as shown at 60 while at the same time maintaining an effective seal on the shaft and also with the housing 56. Obviously, the diaphragm may be supported in the housing or on the housing by any suitable means.

It will be obvious that herein is presented a new type of diaphragm for oil seals or grease retainers which, in addition to being composed of new materials whereby increased flexibility, durability and efficiency results, furthermore has a physical structure which itself is such that a better sealing action results, and the usual constricting spring can be eliminated.

Additionally, one of the main features is the incorporation of necessary curves in that portion 41 of the diaphragm which joins the shaft contacting portion to that portion which is supported and whereby increased resiliency results which allows of a proper seal even on eccentrically operating shafts.

The use of what we call heel, toe and knee structure permits the placing of fulcrums to advantage, achieves better balance, and distributes pressures in a manner which promotes better seals and gives desirable breadth to the wiping surfaces without increasing thickness of retainers.

For example, the wiping surface as seen in Figure 3 is the base of what might be termed a toe and heel structure. Upon the insertion of a shaft into said diaphragm, pressure pushes the forward portion of this base 24a to 18 of the foot structure upward and slightly rotates it about a fulcrum 24 which may be conceived of as its ankle joint. That part which we call the heel 28 protrudes beyond the fulcrum in the opposite direction to the toe 18. The shaft in forcing the toe 18 upward causes the heel 28 to move downward, closing in on the shaft. This arrangement allows for an oversize diameter at the heel 28 at the time of insertion of the shaft which permits easy entry of the same, but which diameter constricts to hug the shaft snugly when the latter is in position.

The toe itself is shaped so as to also give a better sealing surface at the advance edge, being particularly designed to make the pressure of the retaining oil or grease do some work in promoting its own retaining seal. Two or more inclined planes exemplified by 30 and 32 in Figure 3, or hyperbolic or similar convex curves exemplified by 40 in Figure 6, accomplish this to the best advantage.

The fabric surface treated with the improved composition of this invention, including the graphite, has a very low coefficient of friction which permits the use of broader wiping surfaces than has heretofore been possible because much less frictional heat is developed.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A fluid seal diaphragm, composed of synthetic rubber, and an outer layer of fabric, the fabric impregnated with cellulose acetate, the synthetic rubber and fabric molded by heat and pressure whereby the synthetic rubber penetrates the fabric to an appreciable extent, the completed diaphragm adapted to grippingly surround a shaft, a cross section of such diaphragm including a heel and toe portion, a body portion, and a stem portion connecting the body portion to the heel and toe portion, the toe portion being forwardly tapered and outlined by a plurality of inclined plane surfaces, the outer impregnated cloth layer adapted to contact the shaft and having a relatively low co-efficient of friction.

RUBEN O. PETERSON.
WILBURN F. BERNSTEIN.